(12) United States Patent
De Andrade Coutinho Filho et al.

(10) Patent No.: US 12,110,646 B2
(45) Date of Patent: Oct. 8, 2024

(54) DEVICE FOR DESTROYING PLANTS

(71) Applicant: Zasso GmbH, Aachen (DE)

(72) Inventors: Sergio De Andrade Coutinho Filho, Indaiatuba (BR); Matthias Eberius, Wuerselen (DE); Dirk Vandenhirtz, Aachen-Kornelimuenster (DE)

(73) Assignee: Zasso GmbH, Aachen (DE)

( * ) Notice: Subject to any disclaimer, the term of this patent is extended or adjusted under 35 U.S.C. 154(b) by 1604 days.

(21) Appl. No.: 16/333,687

(22) PCT Filed: Sep. 18, 2017

(86) PCT No.: PCT/DE2017/000303
§ 371 (c)(1),
(2) Date: Mar. 15, 2019

(87) PCT Pub. No.: WO2018/050143
PCT Pub. Date: Mar. 22, 2018

(65) Prior Publication Data
US 2019/0223428 A1    Jul. 25, 2019

(30) Foreign Application Priority Data

Sep. 16, 2016  (DE) ..................... 10 2016 011 289.1
Feb. 28, 2017  (DE) ..................... 10 2017 001 827.8

(51) Int. Cl.
*E01H 11/00*      (2006.01)
*A01M 21/04*     (2006.01)

(52) U.S. Cl.
CPC .......... *E01H 11/00* (2013.01); *A01M 21/046* (2013.01)

(58) Field of Classification Search
CPC .................................................. A01M 21/046
See application file for complete search history.

(56) References Cited

U.S. PATENT DOCUMENTS

| 546,682 A | 9/1895 | Scheible |
| 565,671 A | 8/1896 | Cummings |
| 779,791 A | 1/1905 | Sigismund |
| 3,919,806 A | 11/1975 | Pluenneke et al. |
| 4,047,326 A * | 9/1977 | Tibbs .................. A01M 21/046 47/1.3 |
| 2015/0027040 A1 | 1/2015 | Redden |
| 2016/0205917 A1 * | 7/2016 | Chan .................. A01M 21/046 |

FOREIGN PATENT DOCUMENTS

| DE | 41 40 553 A1 | 6/1993 |
| EP | 0 026 248 A1 | 4/1981 |
| EP | 287552 A2 | 10/1988 |
| EP | 1 256 275 A2 | 11/2002 |

(Continued)

OTHER PUBLICATIONS

International Search Report of PCT/DE2017/000303, mailed May 24, 2018.

*Primary Examiner* — Magdalena Topolski
(74) *Attorney, Agent, or Firm* — Hahn Loeser & Parks LLP; Ethan J. Peters (57) ABSTRACT

A device for killing or weakening plants and other organisms, has a conveying device for moving the device, a high voltage source and an applicator which is electrically connected to a high voltage source and which has a sensor-guided height-adjusting device.

19 Claims, 6 Drawing Sheets

(56) References Cited

FOREIGN PATENT DOCUMENTS

| | | | |
|---|---|---|---|
| EP | 2586304 | B1 | 3/2016 |
| FR | 2 473 265 | A1 | 7/1981 |
| FR | 2 488 234 | A1 | 2/1982 |
| JP | H05-56739 | A | 3/1993 |
| JP | H07-170899 | A | 7/1995 |
| KR | 100587841 | B1 * | 6/2006 |
| WO | 9807314 | A1 | 2/1998 |
| WO | 99/17606 | A1 | 4/1999 |
| WO | 2018/050142 | A1 | 3/2018 |

\* cited by examiner

DEVICE FOR DESTROYING PLANTS

CROSS REFERENCE TO RELATED APPLICATIONS

This application is the National Stage of PCT/DE2017/000303 filed on Sep. 18, 2017, which claims priority under 35 U.S.C. § 119 of German Application No. 10 2016 011 289.1 filed on Sep. 16, 2016 and German Application No. 10 2017 001 827.8 filed on Feb. 28, 2017, the disclosures of which are incorporated by reference. The international application under PCT article 21 (2) was not published in English.

The invention relates to equipment for killing and weakening plants and other organisms, which comprises a conveying device for moving the equipment, a high voltage source and an applicator which is electrically connected to the high voltage source.

In order to thin out weeds, for example, it is known to guide a housing provided with electronics to deliver a high voltage at a predetermined distance above the ground. By means of a high voltage between the electrode and an earth contact or the earth or plant, the plant concerned is killed or weakened by an electric shock.

Particularly on railway embankments, in the track bed and the directly adjoining areas, chemical weed control agents are used in order to keep the track area free from unwanted plant growth. In many areas, however, this is undesirable, and therefore EP 1 256 275 A2 and EP 0 026 248 A1 propose equipment of this type which can be used to prevent the growth of plants by means of a high voltage device.

Devices of this type are complicated, very difficult to manage electrically, can only be used at low travelling speeds, do not take into account the increasing number of control and signalling technology in and around the track bed, the increasing number of different types of track bed systems and often only result in limited damage to the plants and to considerable damage to the infrastructure. Thus, until now, this equipment has not yet supplanted chemical plant eradicating agents.

Chemical plant eradicating methods are generally highly effective in their action and are used at speeds of up to 50 km/h. However, they can only be used to a limited extent, or even cannot be used at all in nature reserves and aquatic conservation areas, railway stations, on bridges, etc, for example and in general often only have restricted permits for use because of the (eco)toxicity of the active substances. In addition, some plant types have become resistant to herbicides or can no longer be killed with them, and so those plants can propagate invasively. In some cases, therefore, manual, thermal or mechanical methods are also used, but these are very expensive and labour-intensive or are very difficult to integrate into a high speed process which would be highly advantageous from a logistical viewpoint.

Thus, the aim of the invention is to further develop equipment of this type, in particular but not exclusively for use in rail transport systems in a manner such as to enable high voltage to be used economically and effectively to control unwanted plant growth at transport speeds and which does not suffer from the problems and disadvantages of chemical and thermal/mechanical control for a majority of areas.

This aim is achieved by means of a device of the type described, in which the speed-adapted applicator is provided with a sensor-guided height adjusting device.

The sensor-guided height adjusting device of the applicator opens up a great number of new applications, in particular in the railway area, where traffic areas and adjoining regions, in particular ballast areas and the directly adjoining inspection lines and waysides have to be kept free from unwanted plant growth. The tracks or traffic lines include the traffic line itself as well as inspection lines which are necessary for the traffic for technical reasons; around them, safety distances are specified for trees the growth of which has to be contained.

When using high voltage, fixed current applicators or chains which are dragged over or suspended over the rails and sleepers are used which restrict plant growth by being moved slowly using a large amount of electrical power. However, because of the small number of independently controlled applicators and occasionally poor local management (chains hitting, vibrating drag applicators), this equipment produces an extremely uneven electrical power output, so that areas with uneven growth are not properly treated, or whole areas remain untreated. Plates and chains used as current applicators do not reach small plants in most cases, particularly between the taller sleepers. When in a low configuration, they constantly hit every sleeper and the concomitant wobbling and vibration caused by impacts mean that they readily come into contact with the rails, points and bolts and the increasing number of other technical assemblies. Thus, with applicators of this type, it is only possible to move at a very travel low speed and higher speeds result in greatly increased wear and risk of damage to the applicators and the traffic infrastructure.

The sensor-guided height adjusting device in accordance with the invention for the applicator ensures that even known applicators can be used, as long as they are not uniquely manually adjusted to an optimal height, but can be adapted by means of the sensor-guided height adjusting device during travel, for example to the varying heights of the plant growth and in particular can be automatically and rapidly adjusted by onboard assemblies. This means that, depending on the growth and technical devices on the line to be navigated, the height of the applicator can automatically be adjusted to an optimal value. In this manner, the travel speed of the conveying device can be raised and the applicator can be positioned above the surface to be processed at a continuously adapted height in order to prevent collisions. The height adjusting device is preferably adjusted pneumatically. In this regard, a tightening return spring can sit in an accordion-like, airtight plastic bellows. When the bellows are supplied with compressed air, it extends downwardly and by means of the spring, high voltage is guided onto a contact plate on the underside of the applicator. The underside may be inclined in the direction of travel so that larger plants make contact for longer and are dragged over the applicator better. The level of filling of the bellows or its length may be monitored and controlled electronically in order to get out of the way of obstacles which have been detected by height sensors. A matrix-like arrangement in which a large number of individually controllable applicators are disposed alongside each other and one behind the other are disposed in a grid means that long contact times are possible without making contact with the ground and damage is minimized in the event of a collision if the construction is elastic and only springs back upwardly after the bellows bursts.

In addition to being used for drag applicators, bellows of this type may also be used for a belt system which is used as an applicator, either as a whole or via individual segments.

In equipment of this type, advantageously, the applicator comprises at least one brush. A brush can be guided relatively close to the surface to be treated, because the bristles yield more easily as regards resistance and deflect elastically because of their low mass, but then return to their original position due to attenuation and support in the bundle of bristles. The surface may be erratically rough (ballast) and considerably profiled (sleepers). The air resistance of the brushes, the mobility of the bristles and the self-cleaning capability of the brushes can be controlled particularly well by suitable orientation of the bristles with straight or slightly rearwardly directed dispositions and geometric dispositions of the rows of brushes with inclined rows and helically disposed gaps. However, if the bristles collide too severely with fixed parts of the railway infrastructure, rubbish or plants protruding above the surface, the bristles wear out too quickly and devices can be damaged. Thus, the height adjusting device enables a brush applicator to be used in particular with relatively long bristles or bundles of bristles even at higher speeds of the conveying device relative to the surface to be processed, in particular when taller assemblies such as signalling equipment or points have to be passed over or unavoidable collisions have to occur with as little wear as possible.

Particularly in order to obtain long-lasting effectiveness at high speeds, the invention also concerns a method for using a device of this type, in which the applicator is moved by means of the conveying device over a ground surface and relative to the conveying device, wherein the speed of the applicator relative to the ground surface is varied as a function of the lateral speed of the conveying device relative to the ground surface. This means that the relative speed between the applicator and the growth being trailed over can be optimized to a speed which is usually lower than the movement of the equipment as a whole relative to the ground surface to be treated. In this manner, the mechanical stress on the applicator and the infrastructure is reduced, collision damage is minimized and the efficiency of the applicators is increased independently of the varying lateral speed of the conveying equipment relative to the ground surface for operational reasons.

In a device of this type, advantageously, the applicator comprises at least one brush which rotates at a dynamically adjustable speed. In this manner, the bristle speed relative to the plant (and the track) can be set in an optimized manner for an optimized current transfer and a sufficient contact time to passivate or possibly tear out the plant independently of the operationally necessary varying speed of the transport vehicle. By means of the optimized selection of the rotational speed of the various types of brushes, contact with the ballast or the sleeper can be optimized in a manner such that abrasion at all elements is minimized. A rotating brush can be introduced a long way into the upper interference contour of the erratically rough (ballast) and considerably profiled (sleepers, rail fixings, assemblies) surface. The bristles of a brush turning in this manner touch the objects frequently with fewer than 1/10 of the brushes at this speed and can therefore deflect much more easily or penetrate into the plants. The smaller deflection and vibration of the bristles and the even better function of the attenuation in the brush composite means that the bristles return to the original position particularly quickly and can therefore be inspected locally much more easily. In this manner, weeds much closer to the metal parts can be removed without the risk of arcing. Because rotating brushes can steer wheels in a specific direction by an appropriate arrangement of bristles, even with non-conducting bristles in the edge regions, weeds can be pulled in the direction of the electrical contacts, thereby improving the cleaning power. With an air passage through a set of bristles with a high air resistance or a helical air passage, foliage that is torn out can be specifically removed from the ground simply by the exchange of the load of the air resistance at the upper and lower side of the brushes and can optionally be carried to the exterior. If, however, the bristles collide too strongly with solid parts of the railway infrastructure, rubbish or plants which protrude from the surface, the bristles will nevertheless wear too quickly and the equipment may be damaged. Therefore, the height adjusting device in combination with the use of a rotating brush applicator mean that high speeds for the conveying device relative to the area to be processed can be used, in particular when taller assemblies such as signalling units or points have to be passed over so that unavoidable collisions cause as little damage as possible.

Because the turning brush moves upwards on the side of the direction of travel, the regions where plasma formation and heating of the applicator surface due to the airstream are possible are massively reduced and penetrate into the more and more closely packed bristles. In this manner, sparks can intrinsically be minimized without additional outlay. As an alternative or in addition to a brush or a plurality of brushes disposed one behind the other, the applicator may also comprise a belt which is guided as a continuous belt over spaced rollers. In this regard, the belt preferably moves in the direction of the conveying device, so that the spaced rollers are disposed one behind the other. Like a brush turning about an axis, a belt of this type can be adapted to the relative speed between the device and the surface to be processed, by adapting the circumferential speed of the belt or the brush. A belt also has the advantage that the spaced rollers may be have different separations from the surface to be processed. When, for example, the front roller has a greater separation from the substrate than the rear roller, then taller plants are in contact with the belt for longer than shorter plants. This longer time means that larger plants are processed for longer.

Both with cylindrical brushes as well as with a continuous belt, advantageously, the applicator has a roller within which the high voltage source is disposed. Preferably, the applicator is driven by this roller. This leads to a particularly compact construction.

Because the conductivity of bristles or a belt can be improved by moisture, it is proposed that the equipment be provided with water jets. These water jets may be directed into the applicators or onto a forward position in the travel direction.

Further downwardly directed water jets, which also may be disposed under a sensor-guided flexible height cover, may spray steam or hot water over plants in order to destroy them or at least restrict their growth. Using hot water or steam to kill plants is known. The method consumes a great deal of energy and thus is usually used with very slow-moving road vehicles, where in particular it kills the parts of the plant that are above the ground. In the method described in accordance with the invention, hot water or steam is initially sprayed, after all of the plants protruding above the rail profile have been electrically or mechanically killed or cut down. The method with hot water or steam is especially relevant in combination with the high voltage treatment or in cases in which a high voltage treatment alone cannot be used for reasons of space or for technical reasons; the use of chemical substances can be further reduced or completely avoided with this method. Furthermore, an essential part of the invention is that no other sources of energy are required for preparing the hot water and/or the steam, because in accordance with the invention, the energy is extracted from the cooling water and/or from a heat exchanger in the exhaust gas flow of the current-producing generator unit. The water/wet steam which is temporarily stored can then very quickly be used in large quantities, for example in the ballast bed. The concentrated use, which might be focussed even further by means of hoods and concentrated onto plant growth regions by sensor-guidance, permits an efficient and effective use of the exhaust heat in the context of co-generation.

In order to adapt the equipment to the surface to be processed in an optimized manner, it is proposed that the applicator comprises brushes or belt segments which are disposed so that they can move with respect to each other. Preferably, the mechanisms allow the position of the segments during the movement of the equipment over the surface to be varied. These segments enable an applicator to be adapted in an optimized manner to the processing of a contoured surface such as, for example, a railway embankment. In addition, bristles or surface structures may be provided on the belt which, as flexible elements, improve the contact between the belt and the plants.

Particularly advantageously, the applicator segments are connected to the high voltage source separately from each other. This means that at different times, the segments can be supplied with high voltage, with different and, if appropriate, alternating polarities or with different intensities in order to be able to react individually as quickly as possible to a situation detected by the sensors. In this manner, for example, the deep action of the applicators in respect of the plant growth and the ground resistance/energy consumption can be regulated and controlled. Thus, when the plant density is high, applicators can be used in an energy-saving manner and effectively as plant-plant applicators, and when the plant density is low (sensor/current characteristics of the individual applicators as detection), an applicator may, for example be dropped down to the ground material, preferably on the fine-grained and possibly better-conducting wayside, and act as a better-conducting earth applicator.

The applicator segments may be disposed next to one another in a manner such that several segments form an arc which, for example, may be U-shaped with arms which can be disposed at different angles. In this manner, for example with a railway embankment, the applicators may run over the central track region and the lateral sloped areas in each case and their height will be adapted to the actual situation. On the one hand, with a plurality of applicators, a profiled surface such as a peaked shape may be produced. On the other hand, however, the applicator itself may have a profiled surface. Thus, for example, the bristles of a brush may differ in length so that a roller brush has longer bristles at the edges than in the central region.

Thus, for example in the region near the track bed, brushes may have very long bristles, possibly with appropriate stabilization, so that when they touch solid objects they can deflect, while in a central region over the track, they have shorter bristles.

A specific brush shape has very long flexible bristles, in particular physically directly fixed close to the central axis or fixed using mechanical devices, which deploy under mechanical control or in particular as a function of the rotational speed and make contact with the ground. This allows a free adaptation to the surface contours and a rapid retraction of the bristles from collision regions by rapidly braking the brush.

Even at high travel speeds, there are regions which are definitely free from collisions. In this regions, wires and blades may be used as the current applicators; plants which come into contact with these current-carrying wires or cutters are attacked by the current in one or more sections, and thus the upper portions are almost immediately separated.

A particularly preferred field of application is the use of the equipment with a rail vehicle as the conveying device. The use of other conveying devices such as wheeled vehicles, tracked/chain vehicles, drones, walking conveyors etc, in particular with any installations connected with transport, is equally possible.

Bogies are provided particularly with rail vehicles. In this regard, it is proposed that in the case in which the conveying device comprises a bogie, the applicator is fixed to the bogie. This means that applicator systems can be disposed in the gaps between carrier wagons.

Cumulatively or alternatively, the applicator may also be disposed between two bogies. In this case, a lateral adaptation sensor system is advantageous.

Particularly advantageously, the railbound or non-railbound conveying device comprises one or more actuator robots for operations which in particular are beyond the track bed over the height adjustability of the applicators, which control the movement of the equipment. In this manner, mobile partially autonomous or even autonomous treatment robots are produced.

In this manner, finally, equipment for the treatment of plant growth is produced having a generator, a high voltage unit, a control and at least one movable current applicator pair based on brush contacts or sliding contacts, which may be combined with other mechanical devices, for example for mowing, cutting, sawing and blowing in order, for example, to grasp brambles or other larger plant parts while killing them or after killing them with current by means of gripping equipment, which initially grips the brambles and then energizes the current and then cuts them down.

A particularly advantageous case is when the equipment also comprises a mechanical device for killing or, weakening plants or other organisms by a chemical or physical method. The very combination of high voltage with chemical plant protection or other physical methods for killing or weakening plants offers the possibility, with just a single pass of an area, of extensively compromising the plant growth in compliance with requirements on very different substrates and in regions with very different infrastructures or restrictions on control as dictated by regulations.

In accordance with the invention, as a matter of priority, the high voltage method is used either down to close to the ground or, where this is not possible, to just above the interference edges. In this manner, even with combined applications, tall, deep-rooted plants at the same location are initially killed by electricity, and if necessary, the remaining tall biomass is substantially reduced with the aid of brushes or other applicators.

In this manner, the regions which cannot be reached with high voltage but which are more accessible following the pre-treatment, in particular the ruptured plant interfaces, are sprayed with a minimizable quantity of chemical substances, or other methods such as hot water or steam can now reach the smaller but also less deep-rooted plants which until then had been inaccessible significantly more easily (with less pre-cooling). By alternating the spatial use, exactly those regions which were not reached using high voltage but which had been detected by the sensor system of the plant stock are selectively exclusively treated with chemical or physical methods.

Particular possibilities for the further development of the equipment are opened up when it comprises a memory which is connected to a control device which is connected to the height adjusting device. This means that geoinformation can be used for controlling the system. In this manner, the type of weed control, such as chemical, mechanical or thermal, can be controlled on the basis of the geoinformation. The data may be determined on the basis of line construction data or regulatory data from aquatic conservation areas and nature reserves. Local inputs from automatic sensor data which determine the weed growth on a line or installation data such as energy consumption on the basis of voltage profiles, the spraying agent consumption and other measurements, constitute other possibilities.

In order to protect the equipment even more and use it in an optimal manner, it is proposed that data should be collected regarding the area to be treated, and the high voltage source and/or the height adjusting device should be controlled on the basis of the determined data.

These data may derive from different data sources. Advantageously, during the use of the equipment, data regarding the use of the equipment and/or the areas to be treated and/or the treated areas should be collected. This makes it possible to constantly improve the data set by being able to access these data for each subsequent treatment step.

Furthermore, manual inputs from mobile data capture devices during measurement runs or control runs may indicate constructional data, special plant types, and in particular resistant types. Data of this type may also be acquired using drone flights which are carried out ahead of time or at the same time as the treatment.

These time- or geo-referenced data may also be supported by technical devices to augment reality (augmented reality, 3D glasses, heads-up displays), or automatic lighting guides for marking and for use as a working light. Even with subsequent runs with independent appliances in the complex environment which changes because of the advancing vegetation, by means of the transferred time and location data, the user can input the earlier treatment areas into a live camera image virtually in order to be able to control the treatment outcome better or to initiate further treatments manually or to carry them out automatically using robots.

A physical model of the conveying device offers further advantages, in order to generate respectively optimized eradication methods and procedures by means of automatic context-based assignment of the geodata and other information wherein, for example, braking, acceleration and setup times can be taken into account.

Determination of the productivity data may also form the basis of an accounting system for licence costs for the high voltage treatment and other processing steps in order to use geodata and information regarding the travelled lines, plant densities etc as the basis for billing.

Advantageous exemplary embodiments are described in the drawings and will be described in more detail below. In the drawings:

FIG. 28 shows a front view of the brush shown in FIG. 27, and FIG. 28 diagrammatically shows a cross section through roller brushes profiled with different lengths of bristles.

Figure 1:
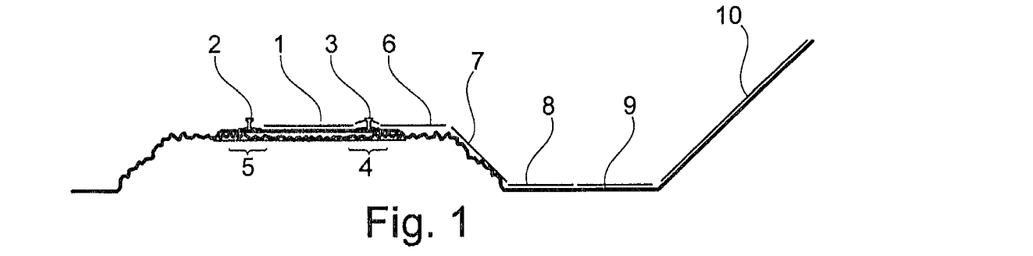
FIG. 1 shows a cross section through a railway embankment with different regions to be processed.

The cross section through a railway embankment shown in FIG. 1 shows different regions which can be processed with the equipment in accordance with the invention. They are the sleeper region 1 between the rails 2, 3, the region 4, 5 between the sleepers, the rail fixings, the region 6 outside the sleepers, the ballast flank 7, the service path region 8, the horizontal wayside 9 and the rising wayside 10, in place of which a dropping wayside, a supporting wall or a ditch might be provided.

Figure 2:
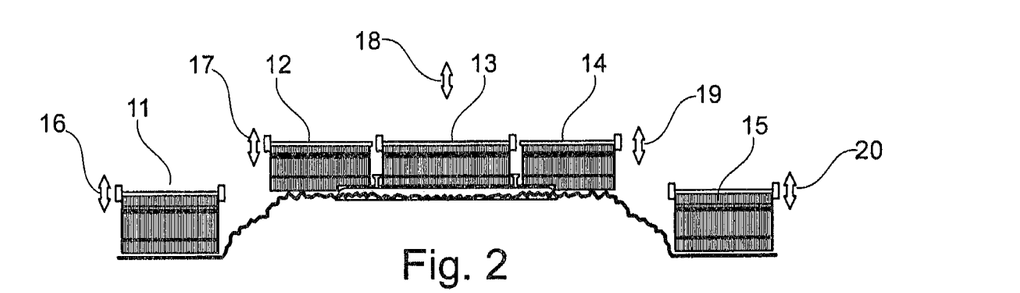
FIG. 2 shows a diagrammatic view of a cross section of an applicator over a line and railway embankment and track bed.
Figure 3:
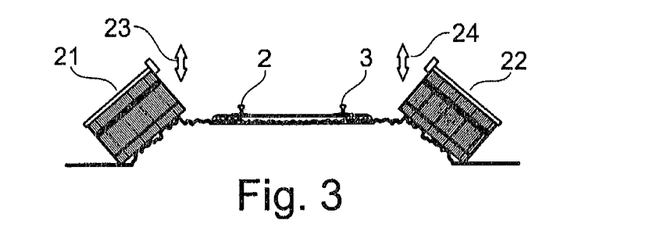
FIG. 3 shows a diagrammatic view of a cross section of an applicator at the ballast flanks.

FIG. 2 shows drag applicators 11 to 15 which can be moved up and down in accordance with the arrows 16 to 20. In the direction of the rails 2, 3, offset with respect to the applicators 11 to 15, the applicators 21 and 22 shown in FIG. 3 are disposed which can be moved up and down in accordance with the arrows 23, 24.

Figure 4:
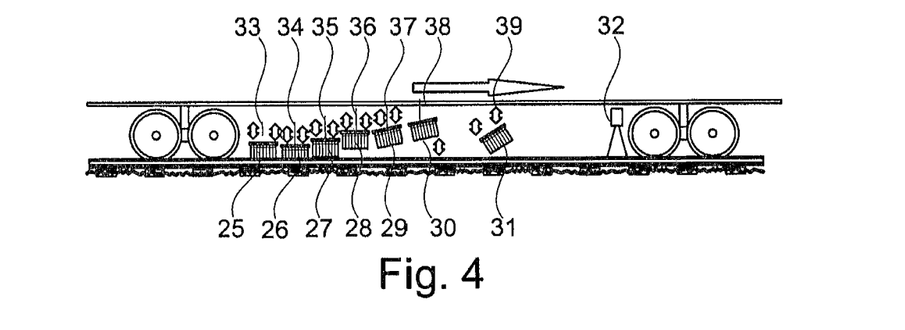
FIG. 4 shows a sensor-based height adjustment for split or brush-like drag applicator units.

FIG. 4 shows a plurality of height-adjustable applicators 25 to 31 which, like the applicators described above, are connected to a high voltage source (not shown) and which can be moved up and down in response to the signal from the sensor 32 by means of height-adjustable devices 33 to 39 in accordance with the height profile determined by the sensor. This allows a continuous adjustment of the height of the applicators in accordance with the substrate and the strength of the plant growth.

Figure 5:
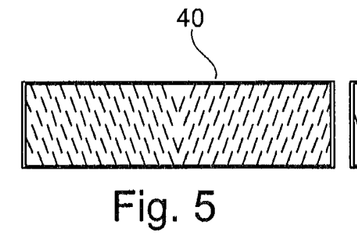
FIG. 5 shows a bottom view of a first embodiment of a static brush with inclined rows of bristles as a further development from straight axial rows of bristles.
Figure 6:
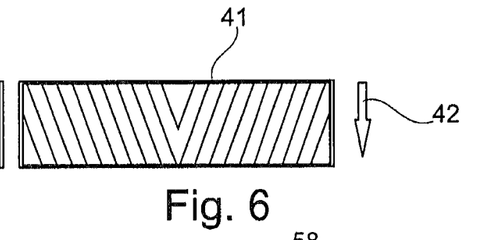
FIG. 6 shows a bottom view of a second embodiment of a static brush with inclined rows of bristles, FIG. 7 diagrammatically shows the function of inclined bristles or bundles of bristles.

The brushes shown in FIGS. 5 and 6 have rows of brushes disposed in a V-shape which ensure that during uniform passage over a surface, material which is torn out is conveyed outwardly. When the brushes 40, 41 move rapidly in the direction of the arrow 42, an air flow is formed which conveys the material outwards and prevents blockages in the brushes.

Figure 7:
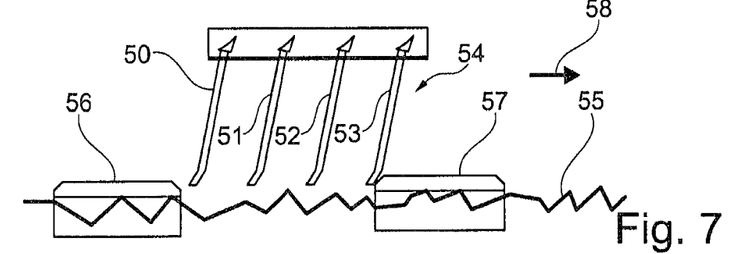

FIG. 7 diagrammatically shows the bristles 50 to 53 of the bundle of bristles 54 which are orientated rearwardly in the direction of travel, which are guided over the ballast material 55 and the sleepers 56 and 57 in the direction of travel 58. The rearwardly facing static bristles reduce the abrasion of the sleepers 56 and 57 and at the same time increase the contact area of the bristles 50 to 53 with the ballast 55 and plants growing there (not shown).

Figures 8, 9, 10, 11:
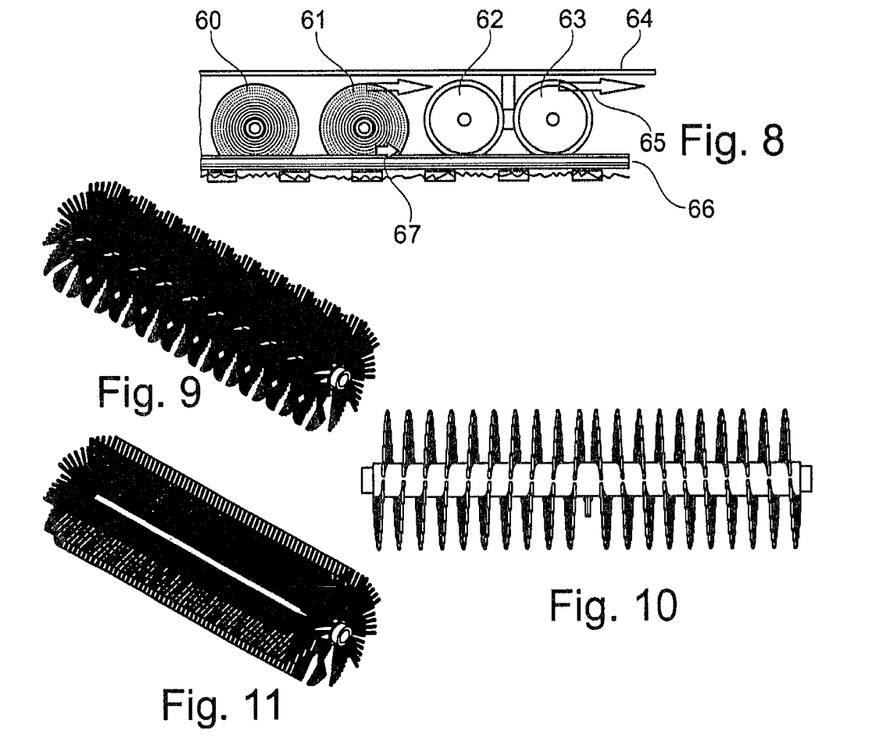
FIG. 8 shows a diagrammatic representation of the dynamics of movement of a brush rotating about itself.
FIG. 9 shows a perspective view of a helical arrangement of the bundle of bristles.
FIG. 10 shows a front view of the bundle of bristles shown in FIG. 9.
FIG. 11 shows a perspective view of a bundle of bristles with inclined bristles at the edge.

The rotating brushes 60, 61 shown in FIG. 8 rotate somewhat more slowly than the wheels 62 and 63. In this manner, the equipment 64 is moved in the direction 65 over the track 66 and the bristles of the brushes 60 and 61, in the direction of the arrow 67, operate more slowly on the substrate and thus exert a force on the substrate which results in a displacement of objects on the substrate in the direction of the arrow 67.

The bundle of bristles shown in FIGS. 9 to 11 have at least helical regions in which the air resistance of the brushes is reduced and torn off objects are conveyed by the brushes, preferably outwardly, with a minimum of opportunity for blockages.

Figure 12:
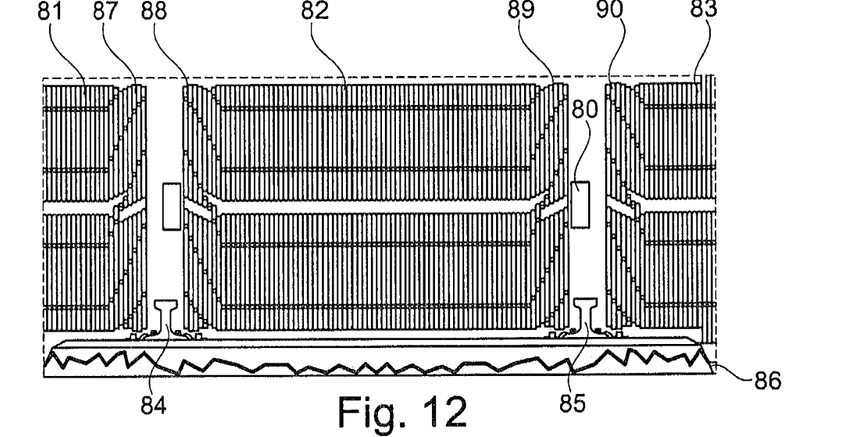
FIG. 12 shows a cross section of rotating brushes in the position of use on a track.

The cross section through brushes 81 to 83 rotating about an axis 80 shown in FIG. 12 shows how the brushes operate in the region of the rails 84 and 85 of the track bed 86. In the region of the fixings for the rails 84 and 85, the brushes 81, 82, 83 have rows of bristles 87 to 90 produced from an insulating material. In this manner, on the one hand, the dense row of bristles leads to an intensive contact between the brushes acting as the applicator energized with high voltage and on the other hand, an electrical contact between the brushes and rails 84, 85 is prevented. While smaller plants (not shown) are only mechanically damaged, larger plants (not shown) receive a weakening or destructive quantity of electrical energy.

Figure 13:
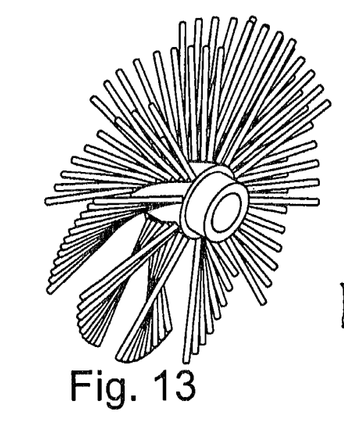
FIG. 13 shows a diagrammatic 3D representation of an edge of a brush with bristle units with an edge intake.

FIG. 13 shows an edge of a brush with a specifically twisted disposition of the bristles. Because of the inclined position of the bristles, materials at the edge of the rails 84, 85 are displaced laterally and outwardly.

Figure 14:
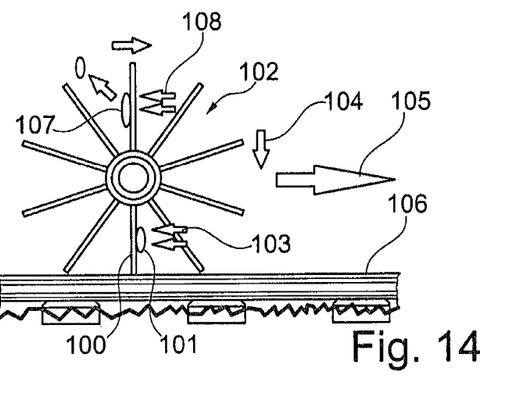
FIG. 14 shows a diagrammatic representation of an exchange of load for stuck objects.

An object 101 adhering to a bristle 100 is pressed against the bristle 100 in the lower region of the rotating brush 102 by the airstream 103. As the brush 102 turns further in accordance with the arrow 104 during the movement of the brush 102 in accordance with the arrow 105 relative to the track 106, the particle 101 moves upwardly and at the point 107 is blown away from the bristle 100 by the airstream 108.

Figure 15:
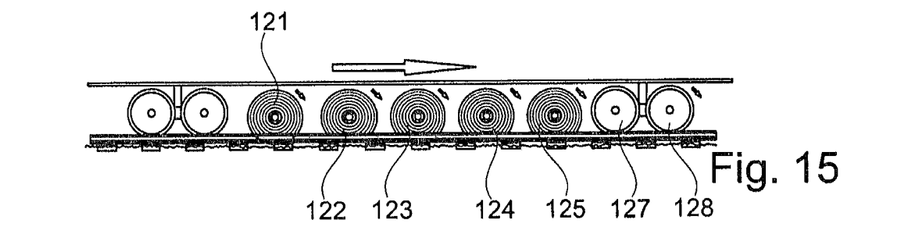
FIG. 15 shows a diagrammatic representation of a series of adjacent rotating brushes.
Figure 16:
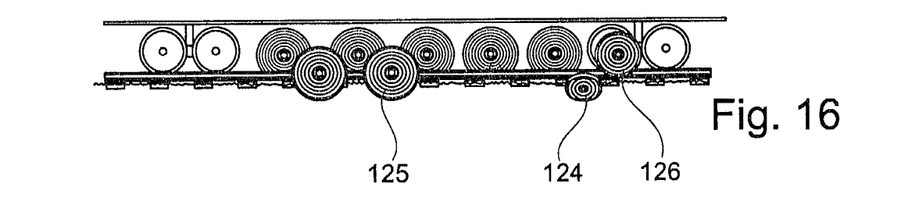
FIG. 16 shows a diagrammatic representation with additional mutually offset rotating brushes.
Figure 17:
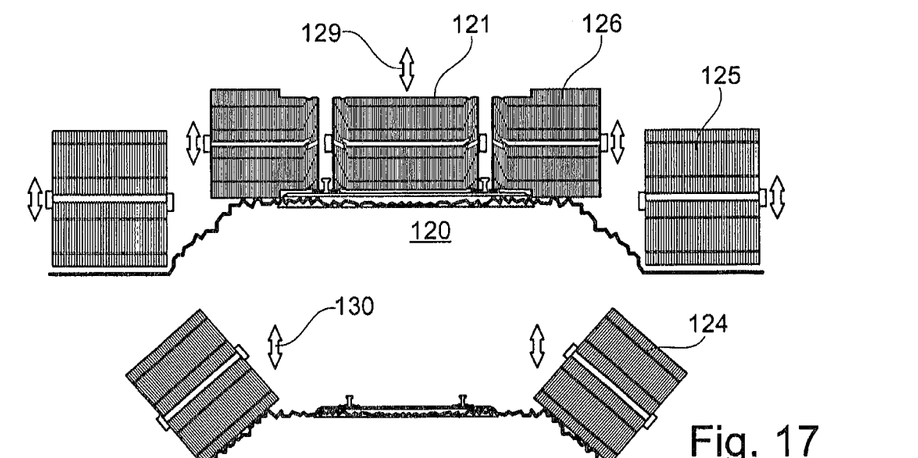
FIG. 17 shows a diagrammatic representation of all rotating brushes in the direct right-of-way.

FIG. 17, in combination with FIGS. 15 and 16, shows how rotatable brushes 121 to 125 disposed one behind the other on a railway embankment 120 can be supplemented by laterally disposed brushes 124 to 126. In this regard, a row of like-poled brushes 121 to 125 may be disposed in a manner such that the brushes are always disposed alternately in the sleeper and in the ballast region. While one brush is disposed in the sleeper region, the adjacent brush is therefore disposed in the ballast region. In this manner, the energy consumption can be reduced, because in each case only half of the brushes are disposed in the ballast region while the other half of the brushes are disposed above the sleepers.

The height of all of the brushes can be adapted by means of sensors to the profiled surface of the rails, sleepers, ballast and other assemblies. In the exemplary embodiment, they rotate under control somewhat more slowly but in the same direction of rotation as the wheels 127 and 128. The height adjustment possibilities of the brushes are indicated with the arrows 129 and 130 (numbered only by way of example).

All of the brushes may have profiled configurations in the region of their radially outer surface. This is shown in FIG. 17 on the brush 126, for example. The arrangement of the brush type 126 in front of the bogie for the wheels 127, 128 shows, for example, the position at which a lateral displacement, such as under the central region of a bogie wagon in order to maintain the alignment, is not necessary.

Figure 18:
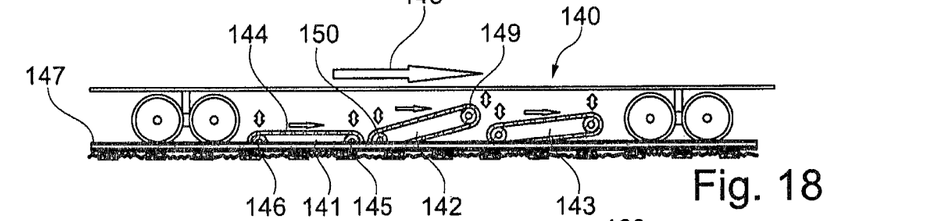
FIG. 18 shows a diagrammatic representation of a belt applicator with height-adjustable rollers.

The equipment 140 shown in FIG. 18 has a plurality of belt applicators 141, 142 and 143 in which a belt 144 is guided around two rollers 145 and 146 in each case. These rollers are height-adjustable in a manner such that the entire belt applicator can be moved to and from the track 147 or the belt can be inclined in a manner such that, in the direction of travel 148, the front roller 149 is higher than the rear roller 150. This means that taller plants are in contact with the belt 144 of the belt applicator for a longer time than small plants and in this manner, can be attacked for longer for a minimal energy consumption. The belt surface in this case may be smooth or provided with brush-like elements and exhibit all of the features of the previously described static and rotating brushes.

Figures 19, 20, 21:
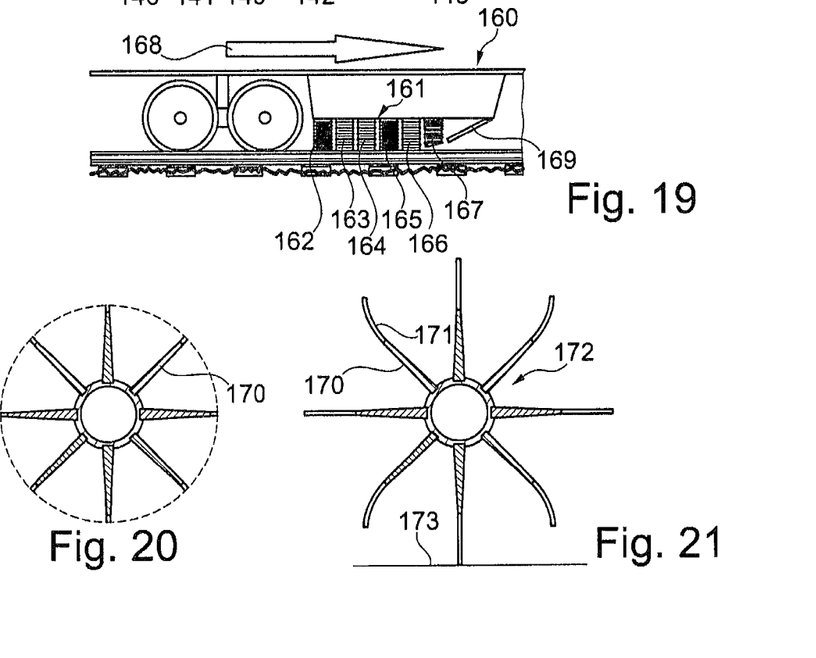
FIG. 19 shows a diagrammatic view of a bellows-based set of drag applicators.
FIG. 20 shows a brush with retracted bristles.
FIG. 21 shows the brush shown in FIG. 20 with deployed bristles.

The equipment 160 shown in FIG. 19 has a set 161 of drag applicators 162 to 167 which can be individually controlled in order to change the height of the applicator. The expanded bellows of the applicators retract again due to the internal spring force. In this manner, the spring is used for the purposes of energy transfer. Forwards in the travel direction 168, a static applicator 169 is provided which applies current to tall plants beyond the technical interference contour.

FIGS. 20 and 21 show flexible bristles 171 housed in sheaths 170 (numbered only by way of example). These bristles 171 can be displaced radially outwardly under gravity or in fact also mechanically as a function of the circumferential speed of the brush 172 so that the bristles 171 can make contact with the ground 173.

Figure 22:
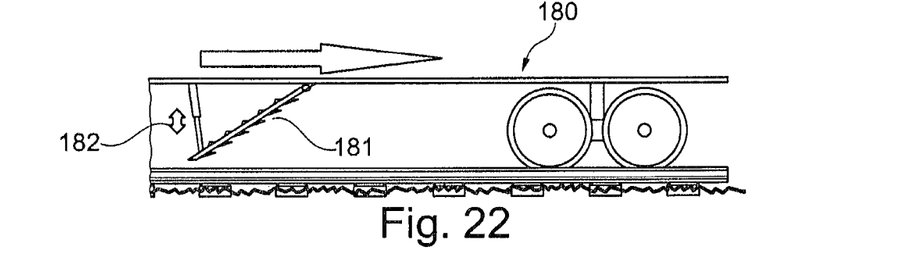
FIG. 22 shows a diagrammatic representation of a stepped height set of height-adjustable blades or wires, FIG. 23 diagrammatically shows a mobile preparation and storage system for hot water or wet steam based on co-generation.

The equipment 180 shown in FIG. 22 has a stepped-height set of blades and wires 181 which can cut or tear out plants when energized with current and at the same time kill or weaken with current. For this purpose, a height adjusting device 182 is provided on the equipment 108 which may also be operated in a sensor-guided manner.

Figure 23:
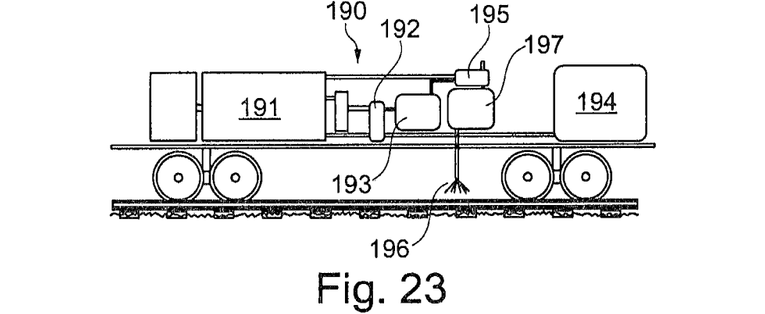

FIG. 23 shows a co-generation-based mobile preparation and storage system for hot water or wet steam. In this regard, cooling water from the engine 191 is cooled in a cross or counter-current heat exchanger 192 using water from a tank 194 and the hot water produced is stored in a tank 193 until ready for use. To obtain temperatures of more than 100° C. or to further exploit exhaust energy, in parallel or downstream, the water may be guided through an oversized exhaust gas heat exchanger 195 in which the water is dispensed for immediate use through the jet 196 or superheated or possibly stored under pressure in a superheated state in a tank 197.

Figure 24:
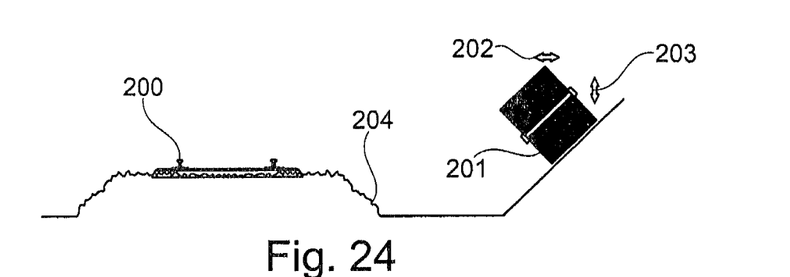
FIG. 24 shows a diagrammatic cross section through the right-of-way with a representation of an applicator which is robotically controlled, disposed on a vehicle located on or near the tracks.

A vehicle travelling on the rails 200 or in fact next to the rails 200 can be set to move slowly in order to robotically treat this region using a brush 201 which can be robotically moved in accordance with the arrows 202 and 203 between the rails and the outer railway region, circumventing signal assemblies and masts.

Figure 25:
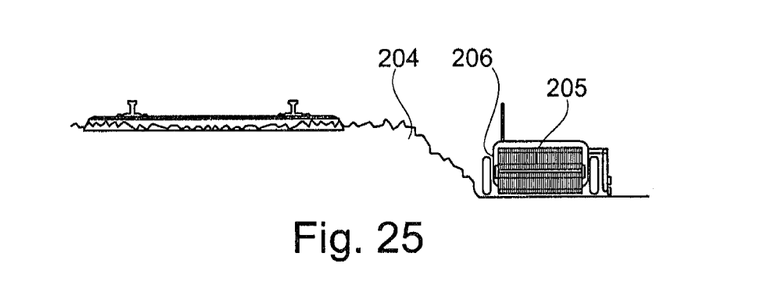
FIG. 25 shows a diagrammatic representation of a sensor-controlled travel and application robot.

In addition to the ballast bed 204, when rail traffic is busy, the right-of-way may be treated with a low sensor-controlled partly autonomous or autonomous travel-and-application robot with a brush 205 which is disposed on a robot 206. In this regard, weeds can be robotically grasped or killed or cut down.

Figure 26:
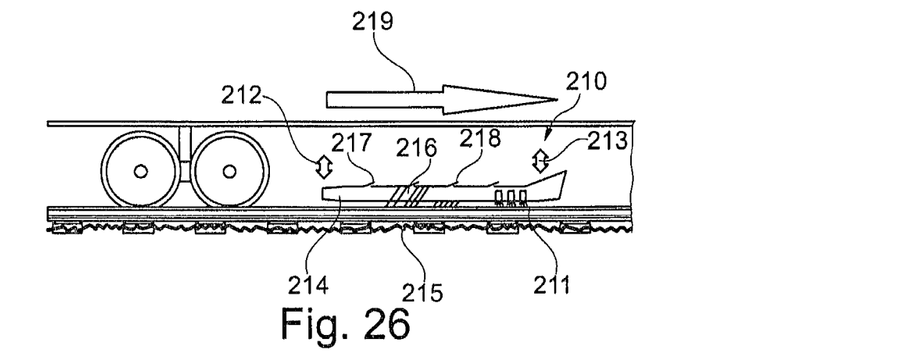
FIG. 26 shows a dispensing system for hot water or steam.

The dispensing system 210 for hot water or steam 211 has a sensor-guided height adjustment 212, 213 with which the drift of the height-adjustable hood 214 can be reduced and the contact time with the track bed 215 can be increased. Inclined downwardly directed bundles of bristles 216 or appropriately disposed flexible strips make it easier for the height adjustment device 212, 213 to set a minimum gap between the hood 214 and the ballast bed 215. Openings 217, 218 on the top of the hood 214 allow a flow of air to enter the region beneath the hood 214, whereupon the hot water or hot steam 211 which is sprayed out can be forced into the track bed during travel in the direction 219.

Figure 27:
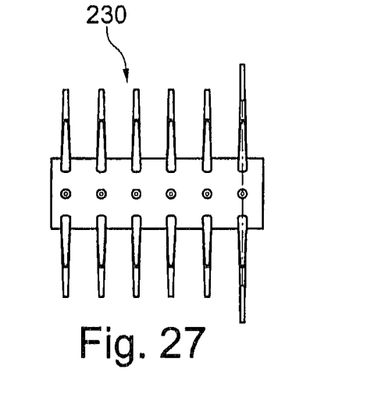
FIG. 27 shows a side view of a brush with long bristle strips stabilized in the central region.
Figure 28:
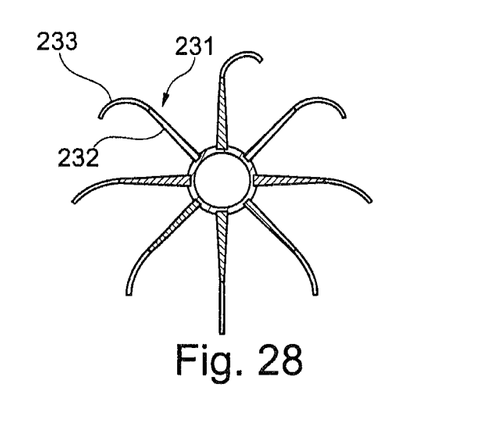

FIGS. 27 and 28 show a further embodiment of a brush 230 with bristles 231 the length of which can be adjusted, which are reinforced in the radially inner region 232 and are flexible in configuration in the radially outer region. The bristles 231 thus have a greater stability in the radially inner region 232 than in the radially outer region 233. In this embodiment as well, the flexible bristle components 233 can be moved out of the mechanically stable bristle retainers of the radially inner region 232 mechanically or as a result of the circumferential speed, whereupon the length of the bristles is increased in order to obtain good contact with the track bed. The flexibility of the outer region 233 of the bristle 231 ensures that the brush 230 is not damaged when the bristles impinge against an obstacle. These bristles may also have different radial lengths at the radial perimeter.

Figure 29:
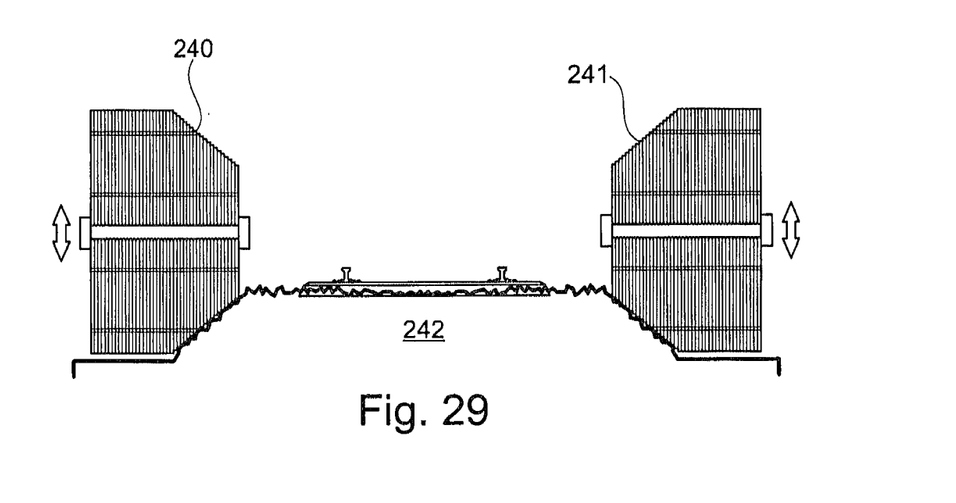

Bristles with different lengths on a roller brush mean that, as can be seen in FIG. 29, profiled roller brushes 240, 241 may be produced which are optimally adapted to the characteristics of a track bed 242. This also means that with a suddenly varying profile of the track bed 242, the longer bristles glide further over the objects with little abrasion, because the flexibility of the bristles makes adaptation to smaller differences in levels easier.

The invention claimed is:

1. Equipment for killing or weakening plants and other organisms, which comprises:
   a conveying device for moving the equipment;
   a high voltage source; and
   an applicator which is electrically connected to the high voltage source;
   wherein the applicator is provided with a sensor-guided height adjusting device;
   wherein the applicator comprises at least one belt which is guided over spaced rollers as a continuous belt; and,
   wherein the applicator is configured to deliver high voltage to plants and other organisms through contact with the at least one belt.

2. The equipment as claimed in claim 1, wherein the applicator comprises at least one brush.

3. The equipment as claimed in claim 1, wherein the applicator comprises a roller within which the high voltage source is disposed.

4. The equipment as claimed in claim 1, wherein the applicator has hollow fiber bristles.

5. The equipment as claimed in claim 1, wherein the equipment has a device for moistening the applicator.

6. The equipment as claimed in else claim 1, wherein the equipment has at least one water jet.

7. The equipment as claimed in claim 1, wherein the applicator comprises brush or belt segments which are disposed in movable manner relative to each other.

8. The equipment as claimed in claim 7, wherein applicator segments are connected to the high voltage source separately from one another.

9. The equipment as claimed in claim 7, wherein the applicator segments are disposed next to each other or one behind the other.

10. The equipment as claimed in claim 1, wherein the applicator has a profiled surface.

11. The equipment as claimed in claim 1, wherein the conveying device is a track vehicle.

12. The equipment as claimed in claim 1, wherein the conveying device comprises a bogie and the applicator is fastened to the bogie.

13. The equipment as claimed in claim 1, wherein the conveying device comprises a robot which controls the movement of the equipment.

14. The equipment as claimed in claim 1, wherein the equipment comprises a mechanical device for killing or weakening plants and other organisms by means of a chemical or physical method.

15. The equipment as claimed in claim 1, wherein the equipment has a memory which is connected to a control device which is connected to the height adjusting device.

16. The equipment as claimed in claim 1, wherein the height adjusting device is pneumatically adjustable.

17. A method of killing or weaking plants comprising the steps of:
   providing the equipment of claim 1;
   moving the applicator over a ground surface relative to the conveying device;
   varying the speed of the applicator relative to the ground surface as a function of lateral speed of the conveying device.

18. The method of claim 17 further comprising the steps of:
   collecting data in the area to be treated;
   controlling the high voltage source or the height adjusting device on the basis of determined data.

19. The method of claim 17 further comprising the steps of:
   collecting data regarding at least one of the operation of the equipment; the area to be treated;
   and the treated area.

* * * * *